(12) United States Patent
Battlogg

(10) Patent No.: US 12,510,915 B2
(45) Date of Patent: *Dec. 30, 2025

(54) MAGNETORHEOLOGICAL BRAKING DEVICE

(71) Applicant: INVENTUS Engineering GmbH, St. Anton i.M. (AT)

(72) Inventor: Stefan Battlogg, St. Anton i.M. (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 717 days.

This patent is subject to a terminal disclaimer.

(21) Appl. No.: 17/909,893

(22) PCT Filed: Mar. 8, 2021

(86) PCT No.: PCT/EP2021/055785
§ 371 (c)(1),
(2) Date: Sep. 7, 2022

(87) PCT Pub. No.: WO2021/180652
PCT Pub. Date: Sep. 16, 2021

(65) Prior Publication Data
US 2023/0102886 A1    Mar. 30, 2023

(30) Foreign Application Priority Data

Mar. 9, 2020 (DE) .................... 10 2020 106 335.0

(51) Int. Cl.
*F16D 57/00* (2006.01)
*G05G 1/10* (2006.01)
(Continued)

(52) U.S. Cl.
CPC ............ *G05G 5/03* (2013.01); *F16D 57/002* (2013.01); *G05G 1/10* (2013.01); *G06F 3/016* (2013.01);
(Continued)

(58) Field of Classification Search
CPC .......... G05G 5/03; G05G 1/10; F16D 57/002; F16D 2200/00; G06F 3/016; G06F 3/0338; G06F 3/0362; G06F 3/03543
(Continued)

(56) References Cited

U.S. PATENT DOCUMENTS 5,842,547 A * 12/1998 Carlson ................. F16D 57/002
188/267
8,193,670 B2    6/2012 Liao et al.
(Continued)

FOREIGN PATENT DOCUMENTS

| CN | 102349218 A | 2/2012 |
| CN | 103807329 A | 5/2014 |

(Continued)

*Primary Examiner* — Christopher P Schwartz
(74) *Attorney, Agent, or Firm* — Laurence A. Greenberg; Werner H. Stemer; Ralph E. Locher

(57) ABSTRACT

A magnetorheological braking device with a fixed mount and with two braking components. One of the two braking components is non-rotatably affixed to the mount and the two braking components are continuously rotatable relative to one another. A first braking component extends in the axial direction. The second braking component has a hollow shell part that extends around the first braking component. A peripheral gap is filled with a magnetorheological medium. The first braking component has an electric coil and a core made from a magnetically conductive material. Magnetic field concentrators on the core and/or magnetic field concentrators on the shell part protrude into the gap, which results in a peripheral gap with a variable gap height. A magnetic field of the electric coil runs through the core and the magnetic field concentrators and through the gap into a wall of the shell part.

28 Claims, 6 Drawing Sheets

(51) Int. Cl.
  *G05G 5/03* (2008.04)
  *G06F 3/01* (2006.01)
  *G06F 3/0338* (2013.01)
  *G06F 3/0354* (2013.01)
  *G06F 3/0362* (2013.01)

(52) U.S. Cl.
  CPC . *F16D 2200/0034* (2013.01); *G05G 2505/00* (2013.01); *G06F 3/0338* (2013.01); *G06F 3/03543* (2013.01); *G06F 3/0362* (2013.01)

(58) Field of Classification Search
  USPC .................. 188/267.1; 267/140.14, 140.15
  See application file for complete search history.

(56) References Cited

U.S. PATENT DOCUMENTS

| | | | | |
|---|---|---|---|---|
| 10,054,186 | B2* | 8/2018 | Battlogg | F16F 9/103 |
| 10,386,929 | B2 | 8/2019 | Eck et al. | |
| 10,976,827 | B2 | 4/2021 | Battlogg | |
| 11,266,867 | B2 | 3/2022 | Battlogg | |
| 11,300,990 | B2 | 4/2022 | Battlogg | |
| 11,360,503 | B2* | 6/2022 | Battlogg | G06F 3/016 |
| 11,815,142 | B2* | 11/2023 | Wellborn | F16D 57/002 |
| 2002/0057152 | A1 | 5/2002 | Elferich et al. | |
| 2011/0128135 | A1 | 6/2011 | Periquet et al. | |
| 2011/0181405 | A1 | 7/2011 | Periquet et al. | |
| 2012/0085613 | A1 | 4/2012 | Böse et al. | |
| 2012/0211315 | A1 | 8/2012 | Shiao et al. | |
| 2015/0136548 | A1 | 5/2015 | Shimura et al. | |
| 2016/0378131 | A1 | 12/2016 | Battlogg | |
| 2018/0073590 | A1* | 3/2018 | Battlogg | G05G 5/04 |
| 2018/0320750 | A1 | 11/2018 | Takahashi et al. | |
| 2020/0355229 | A1 | 11/2020 | Battlogg | |
| 2022/0412416 | A1* | 12/2022 | Battlogg | F16F 9/12 |
| 2023/0375052 | A1* | 11/2023 | Battlogg | F16D 57/002 |
| 2024/0392847 | A1* | 11/2024 | Battlogg | F16D 63/002 |

FOREIGN PATENT DOCUMENTS

| | | |
|---|---|---|
| CN | 104963986 A | 10/2015 |
| CN | 107111368 A | 8/2017 |
| CN | 107710106 A | 2/2018 |
| CN | 107735748 A | 2/2018 |
| CN | 108930731 A | 12/2018 |
| CN | 109073030 A | 12/2018 |
| DE | 112004002908 A5 | 8/2007 |
| DE | 112004002908 B4 | 6/2010 |
| DE | 102010055833 A1 | 3/2012 |
| DE | 102015104927 A1 | 10/2016 |
| DE | 102018100390 A1 | 7/2019 |
| EP | 1168622 A2 | 1/2002 |
| WO | 2012034697 A1 | 3/2012 |
| WO | 2017001696 A1 | 1/2017 |

* cited by examiner

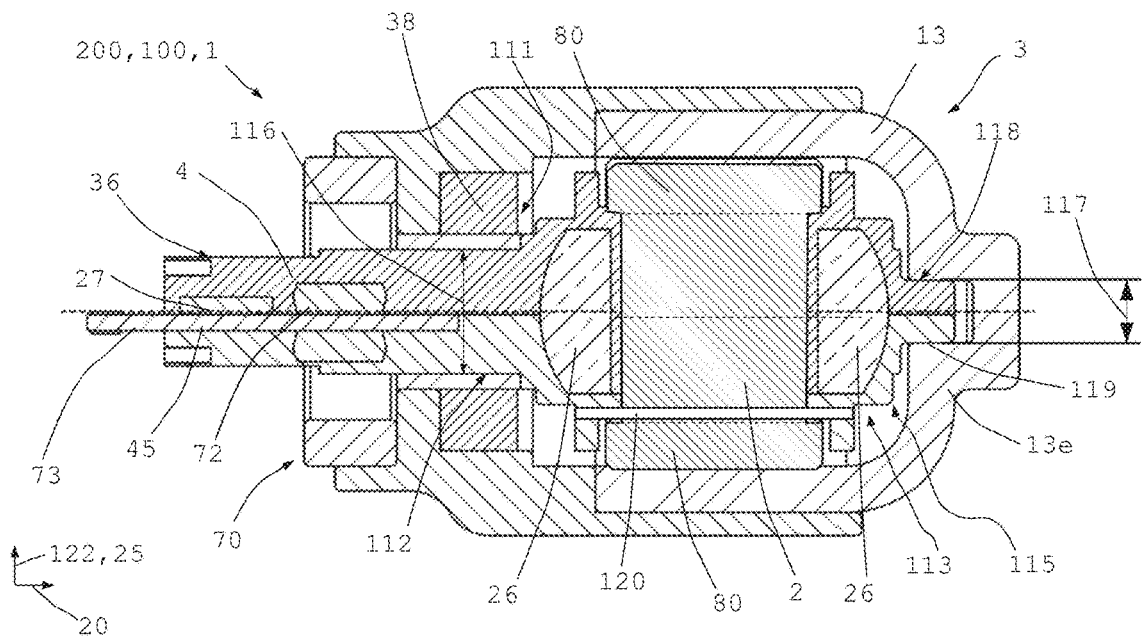
Fig. 7a
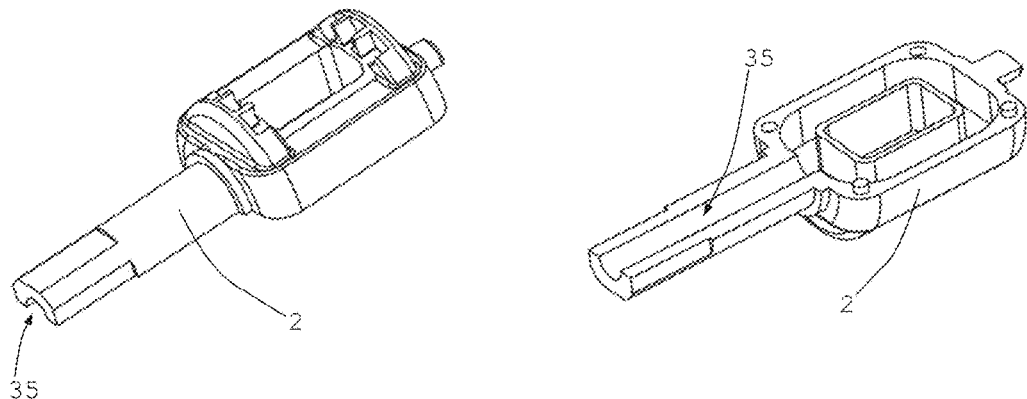
Fig. 7b
Fig. 7c
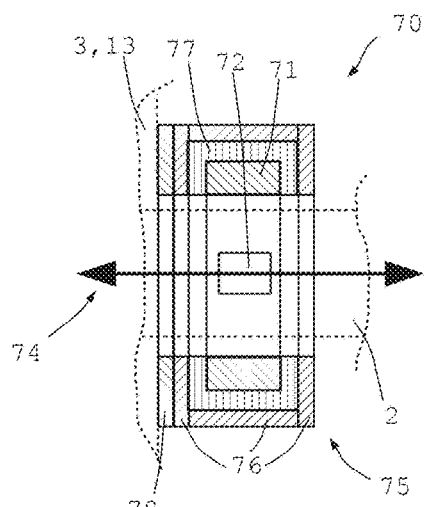
Fig. 7d
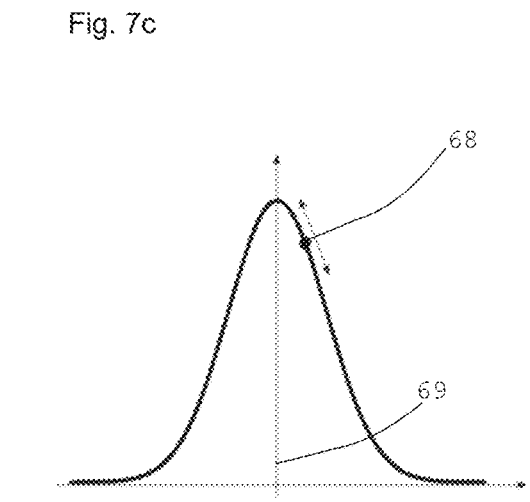
Fig. 7e

MAGNETORHEOLOGICAL BRAKING DEVICE

FIELD AND BACKGROUND OF THE INVENTION

The invention relates to a magnetorheological braking device having a stationary mount and having at least two brake components and/or damper components. The magnetorheological braking device according to the invention can be used for braking mutual relative movements in many technical fields. The magnetorheological braking device according to the invention can also be used as a haptic operating device and be used, for example, for operating technical devices in vehicles, e.g. as a rotary actuator; a rotate/push actuator; for the infotainment system, the air conditioning system (temperature, fan stage, distribution . . . ), as a transmission selector, for the navigation system, in the cruise control system, in the vehicle distance control system, as a seat adjuster, in the steering system or in the steering wheel, in the suspension adjustment system, in the driving mode adjustment system, for adjusting the windshield wipers, for adjusting windows or sunroofs, in the parking assistance system or for setting the (partially) autonomous driving mode, or as a replacement of a steering wheel. The use in motor vehicles, aerospace vehicles and aircraft, ships, boats, agricultural engineering (tractors, combine harvesters, harvesters, other cultivation machines for agriculture), construction machinery, and machines for material handling (forklift trucks . . . ) or in medical or industrial systems is possible. The invention can also be used for the operation, or as an input device, of/for washing machines, kitchen/domestic appliances and devices, radios, still and movie cameras, HiFi and TV systems, smart devices, smart domestic devices, laptops, personal computers, smart watches, in a crown gear of wristwatches or as a computer mouse or as a rotating wheel in a computer mouse or in controllers, game consoles, gaming equipment, as a rotary button in a keyboard, or other devices.

Magnetorheological fluids have minute ferromagnetic particles such as, for example, carbonyl iron powder, distributed in an oil, for example. Approximately round or spherical particles having a production-related diameter of 1 to 10 µm are used in magnetorheological fluids, wherein the size and shape of the particles is not uniform. When such a magnetorheological fluid is impinged by a magnetic field, the carbonyl iron particles of the magnetorheological fluid form a chain along the magnetic field lines so that the rheological properties of the magnetorheological fluid (MRF) are significantly influenced as a function of the shape and intensity of the magnetic field (transmissible shear stresses).

WO 2012/034697 A1 discloses a magnetorheological transmission apparatus which has two couplable components, the intensity of the coupling of the latter being able to be influenced. A duct having a magnetorheological medium is provided for influencing the coupling intensity. The magnetorheological medium in the duct is influenced by a magnetic field. Rotating members on which acute regions that contain the magnetorheological medium are provided in the duct. The duct, or at least a part thereof, is able to be impinged with the magnetic field of a magnetic field generator device so as to selectively (magnetically) interlink the particles, and to wedge them to the rotating member, or release said particles. This magnetorheological transmission apparatus can also be used on a rotary button for operating technical equipment. Such a magnetorheological transmission apparatus functions and permits the transmission of comparatively great forces or torques while at the same time having a relatively small construction mode and construction volume.

Disclosed in WO 2012/034697 A1 is also a rotary button or operating button in which the actual button is attached so as to be rotatable about a shaft. The braking moment can be controlled by way of the magnetic field generated by an electric coil. Should a higher generatable braking moment be desired, cylindrical rollers instead of spherical rotating members can also be used so that the magnetic field acts on a longer distance, or larger area (there being a concentration of the magnetic field and formation of a wedge across a larger area). It has been demonstrated, in particular in the case of rotary or operating buttons having a relatively small diameter, that an increase in the length of the rolling members does not necessarily lead to an increase in the maximum generatable braking moment. It has been demonstrated that the cause thereof lies in that the magnetic field is closed by the central shaft, or has to pass through the latter. The small diameter of the shaft restricts the generatable braking moment, because the magnetic field required for the braking action is rapidly saturated in the (shaft) material. The material passed through by the magnetic field no longer permits any higher magnetic flux, which is why a more intense magnetic field cannot make its way to the rollers either. The smallest cross section passed through by the magnetic field in the entire magnetic circuit defines the maximum possible magnetic flux and thus the maximum braking moment in the brake apparatus. The use of longer rollers as rotating members in this instance can even have a negative effect on the generatable braking moment because the magnetic field is distributed across the longer roller area. A lower field strength bears on (low magnetic field concentration). As the achievable braking effect is not a linear function of the magnetic field but this disproportionally increases in the case of more intense magnetic fields, the achievable braking effect accordingly drops disproportionally in the case of weaker magnetic fields.

SUMMARY OF THE INVENTION

It is therefore the object of the present invention to provide a magnetorheological braking device, which permits a high braking moment (torque), or a higher braking moment (torque) than is the case in the prior art in particular also in the case of small or even very small diameters.

This object is achieved by a magnetorheological braking device as claimed. Preferred refinements of the invention are the subject matter of the dependent claims. Further advantages and features of the magnetorheological braking device are derived from the general description and the description of the exemplary embodiments.

A magnetorheological braking device according to the invention has a stationary mount and a brake housing and at least two brake components. One of the two brake components is connected in a rotationally fixed manner to the mount, and the two brake components are continuously rotatable relative to one another. A first brake component extends in an axial direction and comprises a core of a magnetically conductive material that extends in the axial direction. The second brake component comprises a casing part which is rotatable about the first brake component and is configured to be hollow. An encircling gap which is at least partially and in particular completely filled with a magnetorheological medium is configured between the first brake component and the second brake component. The magnetorheological medium here wets the brake components. Received in the brake housing is (at least) one electric coil. Disposed or received between the casing part and the core is at least one star contour having magnetic field concentrators that are configured thereon and protrude radially into the gap so that an encircling gap having a variable gap height (across the circumferential angle) results in the region of the star contour.

The first brake component defines an axial direction. However, the first brake component, at least locally, can also be configured so as to be angled in relation to the axial direction. The wording pertaining to the core of the first brake component extending in the axial direction in the context of the present invention is understood to mean that the core extends at least also substantially in the axial direction. The core can have a profile which has a slight angle in relation to the axial direction. For example, the core can also be aligned at an angle of 2.5° or 5° or 10° or 15° in relation to the axial direction. The winding of the electric coil can be aligned radially about the core, or can also be aligned in the axial direction about the core (likewise not exactly). The electric coil can also be wound about the core at an angle of 5° or 10° or 15° or the like in relation to the axial or radial direction. In the case of the electric coil being wound axially about the core, it is preferable that an angle between the alignment of the core and the axial direction, and an angle of the winding of the electric coil in relation to the axial direction, are less than 20° and in particular less than 10°.

The magnetorheological braking device according to the invention has many advantages. One significant advantage magnetorheological brake device according to the invention lies in that, as a result of the star contour or a contour similar to that of a star, a high braking moment (high shear stresses) is able to be generated by the magnetic field concentrators.

A particular advantage is derived in that the magnetic field concentrators are fixedly connected to the core, or to the casing part, and are in particular integrally connected thereto. A particularly simple construction which can be produced in a cost-effective manner is made possible as a result by lower assembly outlay. It has been surprisingly demonstrated that the magnetic field concentrators do not have to be configured as self-rotating or as rotatable rolling members but that stationary magnetic field concentrators in a reliable and reproducible manner make available a high increase in terms of the generatable braking moment. The magnetic field concentrators can either be separately manufactured and be fixedly connected to the star contour or directly to the core or the casing part and screwed, riveted, soldered/brazed, welded or optionally also adhesively bonded or press-fitted thereto, for example. Surprisingly, it also possible for the magnetic field concentrators to be attached to the casing part. Overall, a high braking moment is achieved with a small (and even smaller) installation space. As a result, the braking moment can overall be increased, or be maintained in the case of a smaller installation space. This opens up new possibilities, because a higher braking moment than hitherto can be generated with a considerably smaller installation space.

A magnetorheological braking device according to the invention is provided for the use in different devices. The magnetorheological braking device can be used in a haptic operating device or be designed as such. The magnetorheological braking device can also be used in a device component.

A star contour in the context of the present invention is also understood to be a contour similar to that of a star. A star contour in the context of the present invention has radially projecting contour elements as magnetic field concentrators. In particular, a local radius on a contour element is larger than at a position adjacent thereto in the circumferential direction. The maximum local radius there is preferably at least 0.1% and in particular at least 0.25% (and preferably more) larger than a minimum local radius adjacent thereto in the circumferential direction. A plurality of contour elements are preferably configured across the circumference.

The electric coil is preferably wound about at least one portion of the core so that a magnetic field of the electric coil runs through the core and the magnetic field concentrators, and through the gap (extending axially and/or radially) into a wall of the casing part.

The magnetic field, or the magnetic field lines, preferably runs/run transversely through the first or inner brake component. An increase in the length of the first brake component in this instance, at the same diameter, increases the potential magnetic flux and thus the braking moment. The potential core diameter which in most cases cannot be larger for reasons of construction, in this instance does not restrict the magnetic flux.

In the magnetorheological braking device the magnetic field concentrators form transmission components. The magnetic field concentrators, or the transmission components, are at least partially, and in particular substantially completely, or completely, surrounded by a magnetorheological medium. Overall, a magnetorheological fluid is preferably used as the magnetorheological medium.

A plurality of magnetic field concentrators (as transmission components) are preferably disposed so as to be distributed across the circumference of the gap. The magnetic field concentrators are not rotatable about themselves, but rotate conjointly with the brake component to which said magnetic field concentrators are fastened. As a result, a relative movement in the gap occurs during the rotation.

It is possible that even further transmission components are comprised in addition to the magnetic field concentrators or instead of individual segments of the star contour, said further transmission components being configured as rolling members, for example. The term "rolling member" in the context of the present invention is understood to be a rotating member which is suitable to roll on the first or the second brake component in the gap.

In one preferred design embodiment, the magnetorheological braking device comprises a stationary mounting and at least two brake components, wherein one of the two brake components is connected in a rotationally fixed manner to the mount, and wherein the two brake components are continuously rotatable relative to one another, wherein one first brake component extends in the axial direction, and wherein the second brake component comprises a casing part which extends about the first brake component and is configured to be hollow and, at least in portions, cylindrical on the inside, wherein an encircling gap which is at least partially filled with a magnetorheological medium is configured between the first and the second brake component. The first brake component here comprises at least one electric coil and a core which is made from a magnetically conductive material and extends in the axial direction, wherein the core comprises a main body and, as magnetic field concentrators, outwardly projecting core contours such that an encircling gap having a gap height which is variable (across the circumferential angle) results, and wherein the electric coil is wound about at least one portion of the core, or surrounds the core, such that a magnetic field of the electric coil runs through the core and through at least one core contour which projects outward and is configured as a magnetic field concentrator on said core, and through the (axially or radially) outwardly adjoining gap into a wall of the casing part.

In one preferred refinement of the invention, at least one magnetic field concentrator has a cross-sectional area that tapers toward the distal end.

At least one magnetic field concentrator is preferably configured so as to be radiused on the distal end.

It is preferable for the core to comprise a plurality of arms and/or for the casing part to comprise a plurality of arms as magnetic field concentrators, said arms projecting radially and/or axially. Arms project radially outward from the core and/or axially laterally from the core. Arms preferably project radially inward and/or also axially laterally from the casing part.

In all design embodiments it is preferable for at least one arm to be surrounded by an electric coil. A plurality of arms are particularly preferably in each case surrounded by one electric coil.

A radial length of a (radially projecting) arm is preferably smaller than a length of the arm in the axial direction.

At least one electric coil is preferably wound about the axis and in the core generates substantially a magnetic field substantially in the axial direction (radial coil).

The electric coil is preferably received radially (in an encircling manner) between the core and the casing part.

The electric coil, or at least one electric coil, is in particular fastened to the inside of the casing part. In this instance, the electric coil is radially spaced apart from the core on the first brake component. It is also possible and preferable for at least one electric coil to be wound about the core. An electric coil can be wound radially about the core. It is also possible for the electric coil to be wound axially about the core. In this instance, an axis of symmetry of the electric coil extends transversely to the longitudinal extent of the first brake component.

In preferred design embodiments, at least two star contours are received in the brake housing. The star contours can be configured identically and in particular also differently.

Preferably, two star contours are received axially spaced apart from one another. It is also possible for three, four or more star contours to be (in each case) received axially spaced apart from one another. Each of these star contours can be configured identically, or else have a shape that differs from that of the other star contours.

It is preferable for two star contours to be in each case configured identically in pairs.

At least one star contour is in particular configured as a separate (and preferably hollow) annular flange having radially projecting magnetic field concentrators.

The magnetic field concentrators can be configured so as to project radially outward. In this instance, the annular flange is preferably fixedly (and preferably releasably) connected to the core.

The magnetic field concentrators can be configured so as to project obliquely outward. In this instance, the annular flange is preferably fixedly (and preferably releasably) connected to the core.

The magnetic field concentrators can be configured so as to project laterally (axially). In this instance, the annular flange is preferably fixedly (and preferably releasably) connected to the core.

The magnetic field concentrators can also be configured so as to project radially inward. In this instance, the annular flange is preferably fixedly (and preferably releasably) connected to the casing part.

The magnetic field concentrators can also be configured so as to project obliquely inward. In this instance, the annular flange is preferably fixedly (and preferably releasably) connected to the casing part.

The magnetic field concentrators can also be configured so as to project laterally (axially) inward. In this instance, the annular flange is preferably fixedly (and preferably releasably) connected to the casing part.

At least two star contours preferably have a dissimilar external contour. The external contour can differ radially on the inside and/or radially on the outside and/or on at least one axial side, for example.

At least one star contour preferably has radially outwardly projecting magnetic field concentrators and is fastened in a magnetically conducting manner to the core, and in particular on the core. For example, the star contour can be secured on the core by a screw connection.

At least one star contour preferably has radially inwardly projecting magnetic field concentrators and is fastened in a magnetically conducting manner to the casing part (and in particular in the latter).

A magnetic field of the electric coil preferably runs through the core and at least one star contour having the magnetic field concentrators, and through the gap and the wall of the casing part.

If two axially spaced-apart star contours are comprised, a magnetic field of the electric coil preferably runs axially through the core, axially through the wall of the casing part, and through both star contours having the magnetic field concentrators, and the gaps between the star contour and the core, or the casing part, respectively.

In particularly preferred refinements, at least one electric coil is wound in the axial direction about the core and generates substantially a magnetic field in the radial direction (lying coil).

In particular, the magnetic field concentrators form an external contour which is star-shaped (in the cross section).

The casing part preferably has across at least one axial portion a cylindrical internal surface.

The magnetic field concentrators preferably extend across the external circumference of the core by way of at least one angular segment. In particular, each angular segment is smaller than 150°.

No magnetic field concentrator is preferably disposed outside the angular segment (or the angular segments).

The electric coil which in the axial direction is wound about the core is preferably received on the core outside the angular segment (or the angular segments). The electric coil in this instance is in particular adjacent to the surface.

A maximum (external) diameter of the electric coil in a radial direction within a/the coil plane is preferably larger than a minimum (external) diameter of the core in the radial direction transverse, and in particular almost perpendicular, or else perpendicular, to the coil plane. However, the minimum diameter does not have to be perpendicular to the coil plane.

The electric coil preferably extends axially about at least one arm. A radial gap height between an external end of an arm and an internal surface of the casing part is in particular smaller than a radial gap dimension between the external surface of the first brake component beside the arm and the internal surface of the casing part. The surface of the main body can be configured beside the arm. A surface of a casting compound can also be beside the arm when said casting compound is filled, for example in order to reduce the volume for the magnetorheological medium and in particular the magnetorheological fluid (MRF).

The second brake component is preferably disposed so as to be axially displaceable on the first brake component so as to enable volumetric compensation in the event of temperature variations.

In particular, the second brake component by way of two bearing points of dissimilar external diameter is rotatably received on the first brake component so as to, by way of an axial displacement, cause a volumetric variation in a chamber configured between the first brake component and the second brake component.

It is preferable for at least one shielding device for at least partially shielding the sensor device from a magnetic field of the electric coil, or for shielding other magnetic fields, to be comprised.

The shielding device preferably comprises at least one shielding member that at least in portions surrounds the magnetic ring unit, wherein the shielding device comprises at least one separation unit disposed between the shielding member and the magnetic ring unit, and/or at least one magnetic decoupling device disposed between the shielding member and the casing part.

The separation unit and/or the decoupling device has/have in particular a magnetic conductivity which is less than that of the shielding member by a multiple.

The shielding device can be composed of a plurality of parts and comprise, for example, at least one, or else two, axial annular disk(s) and at least one annular sleeve.

It is preferable for the shielding device and the magnetic ring unit to be disposed so as to be mutually spaced apart. A spacer can be disposed therebetween. In simple design embodiments, a plastics material part such as an injection-molded part can be disposed therebetween and keep the parts at the defined mutual spacing.

Configured between the brake components is preferably (at least) one closed chamber (which is externally sealed). The second brake component at a first end of the closed chamber is rotatably received and in particular mounted (on a first bearing point) on the first brake component, wherein the closed chamber is filled substantially or completely with the magnetorheological medium.

The second brake component is preferably received and in particular mounted so as to be axially displaceable on the first brake component such that a volume of the closed chamber is varied as a result of the relative axial displacement of the brake components in order to make available compensation for temperature-related volumetric variations.

It is advantageous for the electric coil in the axial direction to be wound about the core and to generate substantially a magnetic field in the radial direction. This results in the advantage that a stronger braking moment can be achieved by increasing the length of a magnetic field concentrator in the axial direction. At the same time as the magnetic field concentrator is increased in length, the electric coil which extends in the longitudinal direction of the first brake component can also be increased in length (in an expedient manner). A larger passage area (cross-sectional area passed through by the magnetic field) for the magnetic field is made available by an electric coil which is configured so as to be longer in the axial direction. For this reason, an increase in length of the first brake component in the axial direction also causes an enlargement of the cross section of the core. As a result, a stronger braking moment can be achieved by increasing the length of the first brake component in the axial direction.

In preferred design embodiments, at least part of the magnetic field concentrators are composed of a magnetically conductive material. It is also possible for part of the transmission components to be composed of a magnetically non-conductive material. When magnetic field concentrators which are composed of a magnetically conductive material are used, and transmission components which are composed of a magnetically non-conductive material are simultaneously used, the magnetic field is thus concentrated in the region of the magnetically conductive magnetic field concentrators. This leads to the concentration of the magnetic field (increase in the magnetic field strength) and to a local amplification (magnetic field line concentration). For example, as a result, the magnetic field strength in the gap is increased from values of below 350 kA/m up to 1000 kA/m or more. The (high or) concentrated field strength attracts more carbonyl iron particles from the magnetorheological fluid, this causing a carbonyl iron accumulation (clustering). This in turn permits higher shear stresses and thus braking moments to be generated.

As the correlation between a generatable braking moment and the strength of the magnetic field is not linear, and because the generatable braking moment becomes disproportionally stronger as the magnetic field increases in strength, a considerable amplification of the generatable braking moment can be achieved as a result (at an identical installation space/identical dimensions). However, it is also possible for a correspondingly smaller number of magnetic field concentrators to be chosen.

In the event that higher braking moments in the given installation space are required than in the prior art, while at the same time requiring (very) low production costs, the axial width of the magnetic field concentrator can be embodied so as to be very small and as a continuous disk (closed contour). For reasons of production costs, the star-shaped contour, or radially or axially projecting arms of a similar design with intervening spaces, can be dispensed with. The specially chosen (very) small width and the special contour of the magnetic field concentrator herein also concentrate the magnetic field and lead to the high field strengths (in the (annular) gap as described above, and thus to the concentration of carbonyl particles (clustering). While the field strengths in the effective gap, due to the larger transition area, are not as high as in the case of individual arms, said field strengths are sufficient for many applications, in particular in the presence of severe cost pressure.

In all design embodiments it is not necessary for the diameter of the first brake component to be increased in order for the generatable braking moment to be increased. This is therefore very important because many potential applications do not permit any larger external diameter of a braking device, or a larger external diameter would be a serious competitive disadvantage (for example an excessively large lateral adjustment wheel in a wristwatch or in a scrolling wheel of a computer mouse or in a thumb wheel on a motor vehicle). In order for the braking moment to be amplified/increased, the first brake component can be configured so as to be axially larger, this not being a disadvantage, or a smaller disadvantage, in terms of construction space.

In all design embodiments it is preferable for the casing part to be configured on a rotary button or a rotating wheel, or for said casing part to comprise the latter. The rotating part can preferably be configured integrally with the rotary button or the rotating wheel. In such design embodiments it is preferable for the rotary button, or the casing part, to be configured "pot"-shaped. The "lid" of the casing part can be integrally connected to a rotating part configured as a sleeve part, or be separately fastened thereto.

The casing part is preferably composed of a magnetically conducting material, or comprises a magnetically conducting sleeve part and makes available an external ring for the magnetic field. The magnetic field for generating a braking moment runs through the first brake component and passes through the gap on the magnetic field concentrators, the latter being configured to be magnetically conducting. From the magnetic field concentrators, the magnetic field enters the casing part. In the latter, the magnetic field lines run back before the magnetic field lines enter the first brake component again. In this way, a closed magnetic circuit, or closed magnetic field lines, are present.

Under the influence of a magnetic field during a relative rotation of the first brake component and the second brake component, a wedge effect is configured on the magnetic field concentrators, such as is described in principle in WO 2012/034697 A1. The disclosure of this publication is completely incorporated in this application. In the present invention, the braking moment is likewise generated as a result of the wedge effect or the clustering on the magnetic field concentrators even when the magnetic field concentrators cannot rotate about themselves but are fastened to the first or the second brake component.

At least one radial wall thickness of the casing part, or of the sleeve part of the casing part, is preferably at least half the size of a gap width of the gap and/or a radial length of a magnetic field concentrator. A radial wall thickness (of the sleeve part) of the casing part is preferably larger than ¾ of the gap width of the gap. The radial wall thickness (of the sleeve part) of the casing part can in particular also be larger than a radial length of a magnetic field concentrator. As a result of a sufficient wall thickness of the casing part, which is composed of a magnetically conductive material, or of the sleeve part of the rotating part, it can be guaranteed that the desired field strength of the magnetic field can be generated in the region of the rolling members so as to be able to generate a high braking moment.

In all design embodiments it is preferable for a length of the first brake component in the axial direction to be larger than a length of a magnetic field concentrator in the axial direction. When the magnetic field concentrator is configured so as to be shorter in the axial direction than the first brake component, this leads to a three-dimensional concentration of the magnetic field in the peripheral region of the magnetic field concentrator. The magnetic field can practically pass through the gap only in those portions where there is no magnetic field concentrator.

A length of the gap in the axial direction is preferably at least double a length of a magnetic field concentrator in the axial direction. It is also possible and preferable for two or more magnetic field concentrators to be disposed successively in the axial direction.

The first brake component is preferably configured so as to be substantially cylindrical and comprises a main body, which is at least in sections rotationally symmetrical or cylindrical, as the core, and the electric coil or the electric coils. It is also possible for a ball for mounting a rotary button to be comprised, said ball potentially being disposed centrally on the distal end so as to make available a simple and low-friction mounting between the first brake component and the second brake component.

When using a "lying coil" the electric coil can be wound in axial grooves and transverse grooves of the cylindrical main body (of the first brake component). When using a "radial coil" the electric coil can be wound in an encircling groove. The respective grooves are preferably at least partially filled or encapsulated with a casting compound. It is prevented as a result that magnetorheological medium or magnetorheological fluid enters the region of the coil wires. This could lead to the fluid decomposing.

The mount preferably has a cable conduit. Connector cables for the coil and/or sensor cables and the like can be routed through the mount, or the cable conduit of the mount. Easy assembling and a cost-effective production are made possible as a result.

The mount preferably has a receptacle for connecting in a rotationally fixed manner to the first brake component. The mount here can receive the first brake component in a force-fitting and/or form-fitting manner. During operation, the braking moment between the first brake component and the second brake component is dissipated by way of the mount.

The mount preferably has a cylindrical running face for a bearing, and supports the casing part so as to be rotatable on the mount.

A seal for sealing the gap is preferably disposed on the cylindrical running face, wherein the seal is in particular disposed so as to be closer to the gap than the bearing. As a result, the bearing is reliably protected in relation to the magnetorheological medium. Such a design embodiment enables a compact construction and a reliable operation. The bearing can be, for example, a friction bearing or a rolling bearing.

The cylindrical running face is preferably hardened and/or has a surface quality which is superior to that of the radially outer surface of the receptacle. Manufacturing costs can be reduced as a result.

In advantageous design embodiments, the cylindrical running face has an external diameter which is smaller than an external diameter of the receptacle of the mount by at least 3 mm.

The mount is preferably fastened to a console or to another component.

In preferred refinements, a device component comprises at least one magnetorheological braking device as described above. Such a device component can comprise at least one user interface, an operating panel, a display, a touch-sensitive display with or without haptic feedback, and/or at least one sensor.

The use is also possible in a haptic operating device which comprises at least one magnetorheological braking device. Furthermore comprised are preferably a user interface, an operating panel, a display, a touch-sensitive display with or without haptic feedback, and/or at least one sensor. Besides enabling the operation, such a design embodiment simultaneously enables the display or output of information during the operation. In this way, an operating button which at the same time has an output display is made possible, for example.

In all design embodiments it is possible for a pressure-sensitive sensor to be attached to the mount, or for the mount to be assigned such a sensor. For example, a pressure-sensitive sensor can be attached in the mount. However, it is also possible for a piezo sensor to be attached to the lower part, etc. The mount can also be configured in two parts and register a mutual axial displacement of the two parts. Haptic feedback can take place in the process.

In all design embodiments it is preferable for a difference between an available internal diameter (of the sleeve part) of the casing part and an external diameter of the first brake component to be more than 3 mm and less than 90 mm. It is likewise preferable for an external diameter of the (sleeve part of the) casing part to be between 5 mm or 10 mm and 120 mm. A height of the casing part is preferably between 5 mm and 120 mm. In all design embodiments it is preferable for a control device to be comprised, said control device by way of the electric coil being configured to initiate a variable braking effect.

Overall, the present invention particularly preferably operates according to the fundamental principle of wedge-action clamping, wherein a magnetic field concentrator slides along the walls at a specific spacing, or optionally rolls on said walls. The wedge effect is created by a magnetic field so that a high braking moment is able to be generated.

Moreover, better scalability can be achieved by using a "lying coil". As a result, it is possible for a greater braking moment that is able to be scaled to be generated by means of longer magnetic field concentrators and an axially longer electric coil. The diameter of the first brake component here does not have to be chosen larger in order for a corresponding magnetic field to be directed through said first brake component, because the area of the core (cross-sectional area) becomes larger as the core is extended in axial length. The axial length can optionally also be significantly reduced if only a relative minor braking moment is required. The installation space can be accordingly adapted.

A further advantage lies in that the routing of the electrical connector cable for the electric coil is possible in a simple manner as with a view to volume production. A tightness of the magnetorheological braking device and scaling can be made possible by way of simple means.

In principle, a greater moment can be generated by the magnetorheological braking device across longer magnetic field concentrators (in the axial direction), because the effective length is increased. At the same time, it is guaranteed by the larger core area that the magnetic field concentrators are always exposed to a corresponding magnetic flux density. The magnetic field strength at the "wedge" on the magnetic field concentrators can be chosen higher than in the prior art. Long magnetic field concentrators or a plurality of axially offset magnetic field concentrators to which a sufficiently intense magnetic field can be supplied can be used.

In particular when using a "radial coil", the magnetic field generated by the electric coil runs axially through the core, radially through the magnetic field concentrators and is closed axially by way of the (sleeve part or) the casing part or the external cylinder. The magnetic field lines here are closed once in the one half of the casing part, and for example the lower or left half, and once again in the other half of the casing part, and for example the upper or right half. In simple design embodiments the magnetic flux thus runs substantially in a two-dimensional manner. The configuration of the magnetic field concentrators in terms of length or height is irrelevant here. As a result, arbitrary scaling in terms of the length can be achieved because the magnetic field transmission area increases conjointly.

In contrast, in the case of electric coils ("radial coils") which are wound concentrically about the longitudinal direction of the first brake component, the cross-sectional area in the core remains identical and may form a bottleneck for the magnetic field as long as the diameter is not changed. In rotary buttons in the motor vehicle, the core regularly has a sufficient diameter in order for the desired braking moment to be applied. The required diameter of the first brake component therein is not particularly disadvantageous in terms of the required installation space, the installed dimensions and the weight of the magnetorheological braking device. It is advantageous that the rotating speed of rolling members does not vary with the stationary magnetic field concentrators now used, said rotating speed variation potentially being disadvantageous.

When longer magnetic field concentrators are used, the braking effect of a magnetic field concentrator that is elongate in the axial direction may be better than in the case of two shorter magnetic field concentrators of the same overall length. The reason for this is, inter alia, that the liquid has to be displaced over a longer distance because the periphery is farther away (hydrodynamic pressure). In turn, two short star contours can have advantages by virtue of a symmetrical construction.

In preferred design embodiments, the magnetorheological braking device has a diameter (of the sleeve part) of the casing part of between approximately 5 and 80 mm (+/− 20%), in preferred design embodiments approximately 10 to 40 mm.

Overall, the invention makes available an advantageous magnetorheological braking device ("MRF" brake). The external diameter of the MRF brake here is in most instances predefined, in particular in the case of haptic applications. There are ergonomic guidelines in this regard. Therefore, the core cross section generally cannot be that easily enlarged, because the external diameter increases conjointly therewith (button wheel or thumb wheel or mouse wheel external diameter; area for the fingers). Moreover, a higher blocking moment is required as the external diameter increases, because the moment interval has increased for this reason. (The finger force, thus the (tangential) force between the activating finger(s) and the brake element, or the external surface of the brake element, must or should remain the same because the user is able to apply only a specific force, on the one hand, and the forces required on the fingers (at the fingertips) are important in terms of a comfortable feeling during activation (operating comfort)).

The electrical coil (electric coil) can extend axially in preferred design embodiments. The magnetic field generated by the coil in this instance runs radially through the core, then through the magnetic field concentrators, and is closed by way of the external cylinder (in each case by the opposite halves). This remains identical, irrespective of the height (or the length) of the rolling members or the MRF brake.

The invention achieves the objective of obtaining an ideally simple but nevertheless readily scalable MRF brake with a high braking moment and at the same time a compact external diameter.

A flat material, or a wire with an adapted contour, of copper or any other suitable material can be used instead of a (cylindrical) coil wire.

The core, the magnetic field concentrators and the external cylinder can be made from a simple steel (for example S235), without high requirements in terms of the surface characteristic and hardness, said steel preferably having good magnetic properties. The surfaces which move toward one another and generate the brake moment can be rough or/and have a surface structure (e.g. knurlings, pyramids . . . ).

The core, including the electric coil and the casting compound, are preferably centered in a "mount" and fixed (force-fitting or form-fitting connection), and the counter torque by way of said "mount" can be dissipated to a console, a base plate, a receptacle plate or a housing. The mount preferably has a bore through which the cables are routed. A sealing element (for example an O-ring) seals the cable in relation to the mount or the interior space, so that no liquid from the interior space can makes its way to the outside by way of the cable. In addition to the (coil) cable, a temperature sensor cable or another sensor cable can also be routed through this opening.

The mount can also be produced from a material that is different from that of the core, the rolling member or the external cylinder. The reduction in the diameter of the mount on the running face has the advantage that the frictional radius for the sealing element is decreased, this reducing friction overall. Moreover, due to the resulting increased construction height, a bearing element which has a bearing external diameter that is identical to the internal diameter of the casing part can be used. This reduces the production costs of the casing part; no production-related shoulder (undercut) is required. The preferred rolling member height is between 3 mm and 6 mm, but may also be 1 mm or 2 mm. It is difficult to obtain good bearings or sealing elements in this range, unless the internal diameter of the mount achieves additionally installation height.

A decorative element, or another element, for example a rubberized button, can be fitted over the external cylinder or the casing part.

A ball or a ball-shaped or ball-like component (may also be semi-spherical) can preferably be seen axially at the top, between the external cylinder and the casting compound. Said ball guides the two parts relative to one another. The ball is preferably fixed in the casting compound, and the inner axial end side of the external cylinder rotates relative thereto. A simple, low-friction and cost-effective bearing (bearing point) is achieved in this way. A conical shape or the like is also possible. However, any other type of mounting (for example a friction mounting or a rolling mounting) can also be chosen instead of this type of mounting.

At least one component that is passed through by the magnetic field is preferably at least partially or completely composed of the material FeSi3P.

A star contour can in principle be applied not to the core but also, from the inside, to the surrounding casing part or sleeve part. Such a construction can offer advantages in the basic design of the coil. Space is moreover gained. In this case too, different variants of coils can be chosen. An axial coil, or a "lying coil", is also possible. A coil that is wound about the rotation axis is also possible.

Advantageously, there is no more core material present radially outside the electric coil, because the magnetic field otherwise would be able to be closed thereby, this potentially resulting in magnetic losses. Depending on how the "lying coil" is positioned, it is also conceivable that more than one "lying coil" is used. A radial coil would also be readily conceivable, because the field is closed simultaneously by all "teeth" or magnetic field concentrators in this way.

In preferred refinements of all design embodiments, the maximum generatable torque (field strength profile in the effective gap; wedge effect), and/or the response time (the time until the moment prevails in the event of abrupt energizing or current leaps=step response) is a function of the chosen inlet angle at the arms, or the respective distal ends of the magnetic field concentrators. The angle generated by the external design of the radial end of the arms and of the mating face, and the length of the face, influence that maximum generatable torque and the response time when a magnetic field, or the field strength, is being built up in the effective gap. Flatter (smaller) inlet angles and/or longer faces increase the achievable moment. Larger (steeper) inlet angles and/or shorter faces decrease the response time. Flatter angles are, for example, an angle between 0° and 10°, or preferably between 10° and 20°. Larger angles are between 20° and 30° or between 30 and 45°. It is also possible for negative angles to be implemented, thus curved in the inward direction. For example −5°.

It can also be advantageous to mix different contours/angles/shapes. A pip/tooth of the star contour in this instance generates higher moments at low rotating speeds, the other pip/tooth generates said higher moments at medium rotating speeds, and the third pip/tooth generates said higher moments at high rotating speeds. A braking device that generates high moments across the entire rotating speed range can be made available in this way.

A disk or an annular flange without a star contour is easier to manufacture and can thus be manufactured in a more cost-effective manner. However, the braking output (braking moment) is not the same. Depending on the requirements in terms of installation space, production costs and potential braking moment, either a star contour can thus be used (for higher power densities), or else a continuous disk can be used in the event of lower requirements in terms of the power density but higher requirements in terms of the production costs. The disk can be configured in a rotationally symmetrical manner.

However, besides the dissimilar braking moment of the different contours, dissimilar response times must additionally be taken into account. The more magnetizable material is used in the construction, the longer it takes for the magnetic field to magnetize the entire material and to develop the full output (inductivity). This means that less material decreases the response time of the actuator.

The response/switching times which are required for the application are thus an additional criterion when choosing the contour. These requirements change depending on the customer and the intended application. Very fine ticks/ripple (changing torque) require very short response times (a few milliseconds).

Typical dimensions or values of the contour elements or "teeth" of star contours, respectively, are 5% to 15% of the overall diameter. For example, in one specific design embodiment, the maximum diameter of the star contour (having outwardly protruding contour elements or "teeth") is 36 mm and the height of a contour element or a magnetic field concentrator or the teeth is approximately 2.5 mm, respectively. A minimum diameter is thus 31 mm. This corresponds to a relative size of 7% of the diameter. A star contour having typical deviations from the disk form would be, for example, depressions of 5 to 10% of the overall diameter.

A range of the depth of the depressions is preferably from 0.25% to 25%. In particular between 0.5% and 10%.

The manufacturing costs decrease as the heights of the teeth become smaller. Therefore, it can be advantageous to use only very small deviations from the round disk.

A star contour having comparatively minor deviations from the disk form would be, for example, small concavities of 1 to 3% of the entire diameter.

The width of the star contour can also vary. In preferred design embodiments, the width is between 1 mm and 25 mm. Specifically, widths of 3 mm and 6 mm have been successfully tested.

In particular, the haptic operating device according to the invention is preferably used to generate a high power density of a braking device or a brake unit with a magnetorheological fluid, wherein this is achieved by contour elements which concentrate the magnetic field.

In this way, the carbonyl iron particle is in particular attracted from the environment and concentrated in the transition region of the magnetic field.

The applicant reserves the right to claim a method for generating an increased power density of a braking device having two brake components and having a magnetorheological fluid and at least one electric coil, wherein the increased power density is generated by a stationary brake component and a brake component which moves so as to rotate about the central axis of the stationary brake component and is magnetically directly in contact with the latter, wherein contour elements which concentrate the magnetic field are disposed on one of the two brake components and are in particular connected thereto in a rotationally fixed manner.

A further method serves for generating a high power density having a braking device having a magnetorheological fluid and at least one electric coil, wherein this is generated by a stationary element and an element which moves so as to rotate about the central axis of the stationary element and is magnetically directly in contact with the latter, said elements concentrating the magnetic field.

In particular, carbonyl iron particles are attracted from the environment and concentrated in the transition region of the magnetic field.

The brake component moving so as to rotate about the central axis is preferably integral.

Further advantages and features of the present invention are derived from the exemplary embodiments which are explained hereunder with reference to the appended figures.

BRIEF DESCRIPTION OF THE FIGURES

In the figures:

FIGS. 7a-7e show a further device component; and

DETAILED DESCRIPTION OF THE INVENTION

FIGS. 1a to 1f shows a plurality of device components 200 according to the invention, in which the magnetorheological braking device 1 can be used. The device components 200 here are in each case embodied as a haptic operating device 100.

Figure 1A:
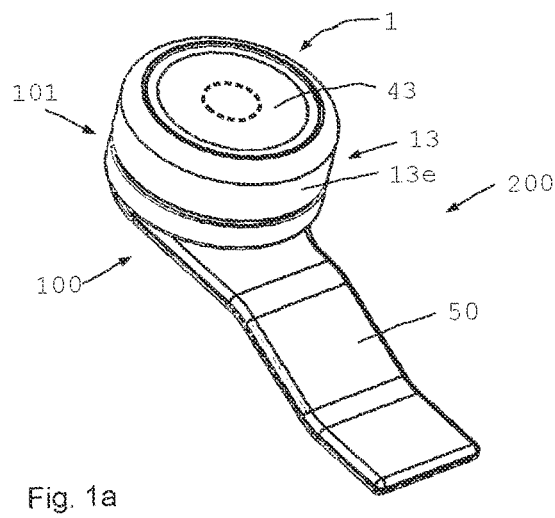
FIGS. 1a-1f show schematic three-dimensional views of device components having a magnetorheological braking device.

FIG. 1a shows a haptic operating button 101. The operating button is fastened by way of the console 50. The operating button 101 is operated by way of the casing part 13 or the sleeve part 13e. The user interface 43 can be additionally utilized for transmitting information.

Figure 1B:
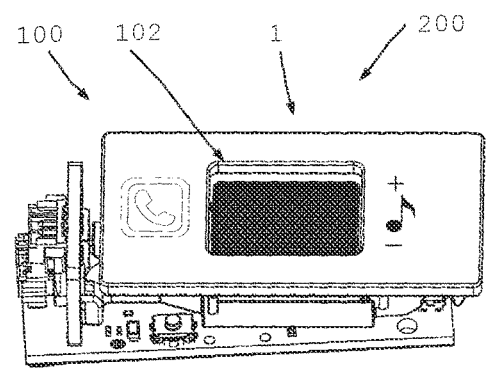

The device component 200 in FIG. 1b is illustrated as a thumb wheel 102 with a haptic operating device 100. The thumb wheel 102 is preferably able to be used in steering wheels, for example. However, the thumb wheel is not limited to this specific application. In general, the thumb wheel 102 can also be used with any other finger, depending on the installation situation.

Figure 1C:
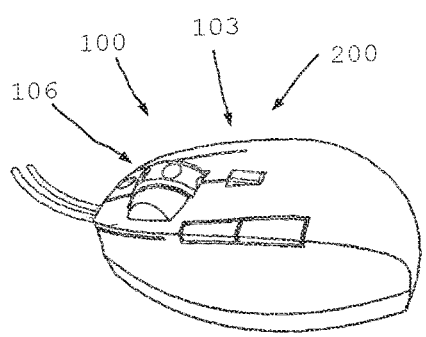
Figure 1D:
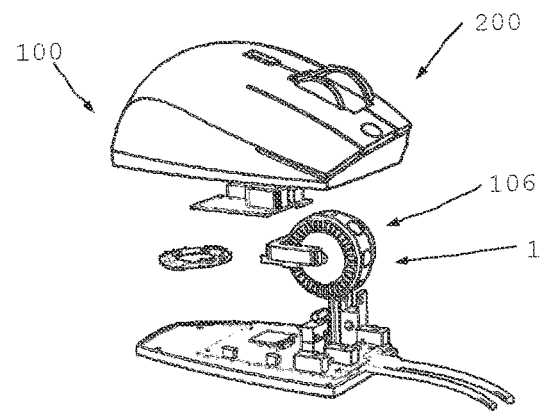
Figure 1E:
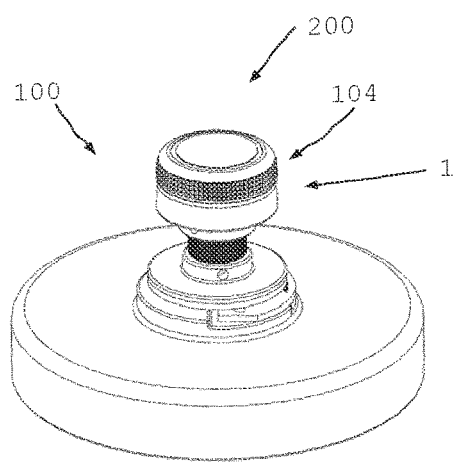
Figure 1F:
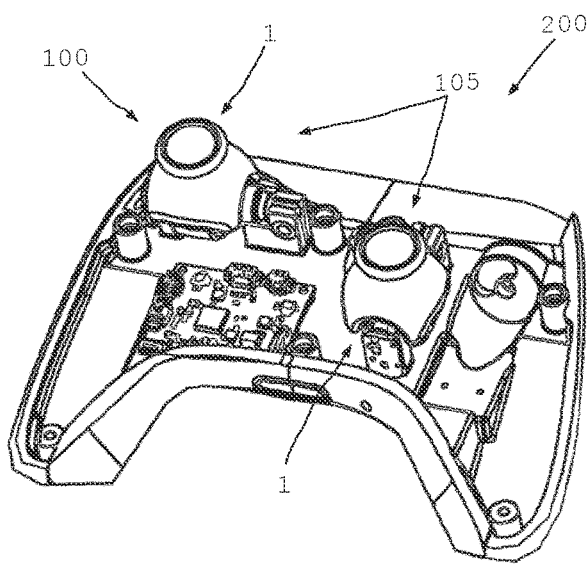

The device component 200 in FIG. 1c and FIG. 1d is embodied as a computer mouse 103. The haptic operating device 100 is disposed in the mouse wheel 106. The magnetorheological braking device 1 can be utilized for controlling haptic feedback.

FIG. 1d shows a joystick 104 as a haptic operating device 100 in which a magnetorheological braking device 1 is disposed. Moreover, the magnetorheological braking device 100 according to the invention is preferably also able to be used in a game pad 105 so as to provide haptic feedback to the player as a function of the game situation.

In these exemplary embodiments, the magnetorheological braking device 1 has a casing part 13 or a rotating part or a sleeve part 13e, which is rotatably received. The torque required for rotating the casing part 13 or the rotating part 13 is adjustable.

A user interface 43 can be disposed on the upper side of the magnetorheological braking device 1. Such a user interface 43 can be configured, for example, as a display device or else as a touch-sensitive input possibility (touchpad, control by movement or gesture, image recognition . . . ).

For example, a haptic operating device 100 can be used for operating machines, medical equipment or for use in and for the motor vehicle. In a vehicle, the haptic operating device 100 can be used, for example, for operating air conditioning systems, radios, the entertainment system, the navigation system, the vehicle distance control system, the driver assistance system, for adjusting the seats and for operating the infotainment system. The use of other apparatuses or other devices is also possible.

Figure 2A:
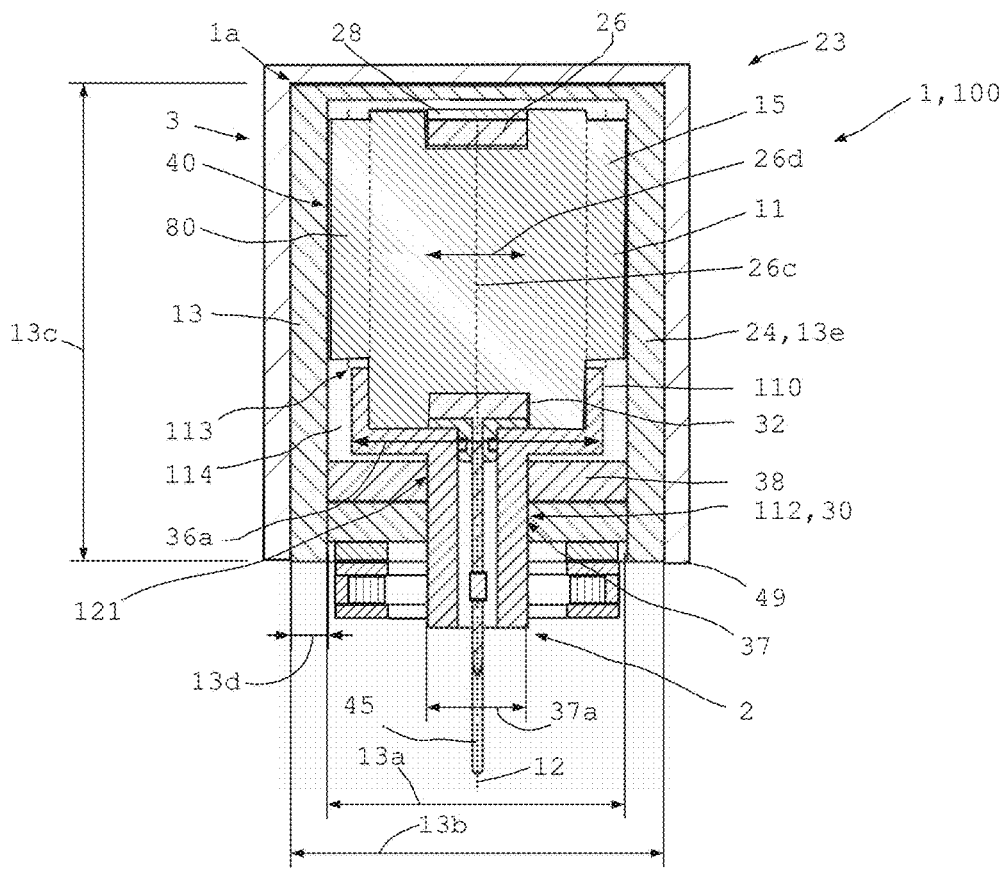
FIGS. 2a-2c show schematic cross sections of a further device component having a magnetorheological braking device.

FIG. 2a shows a device component 200 according to the invention having a magnetorheological braking device 1 according to the invention, in a sectional view. Transverse grooves 32 in which the electric coil 26 of the magnetic field generator 113 at the axial ends of the core 21 are wound can be seen. Connection cables 45 are led out here downwardly. The magnetic field extends within the core 21 perpendicularly to the coil plane 26c in the radial direction 26d. A casting compound 28 is in each case provided in the axial direction for closure at both ends. A separate seal, for example by way of the plotted O-ring or the like, is provided in the region of the cable conduit 35.

The wall thickness of the presently cylindrical casing part is calculated from the between the external diameter 13b and the internal diameter 13a of the casing part 13.

A length, or height 13c, of the magnetic field concentrator 80 and of the casing part 13, or of the sleeve part 13e, or of the second brake component 3 in the axial direction 20 is preferably between 1 mm and 100 mm, or between 5 mm and 90 mm. A covering 49 can be attached to the outside of the second brake component 3 so that the external appearance of the rotary button 23 is determined substantially by the surface of the covering 49.

The material of the sleeve part 13e or of the casing part 13 overall is magnetically conducting and serves for closing the magnetic circuit. A wall thickness 13d of the sleeve part 13e is preferably half the size of a radial extent of the magnetic field concentrators 80. The casing part 13 forms an external ring 24.

The diameter 36a of the receptacle 36 is preferably significantly larger than the diameter 37a of the cylindrical running face 37. The friction on the seal 38 is reduced as a result. Moreover, standardized bearings can be used.

A (flange-fitted) sensor (rotary encoder, angle transmitter) detects the rotating speed (the rotation angle) of the operating unit.

It is also possible for the core 21 and the mount 4 to be embodied in two parts. The separation preferably runs along the centerline drawn in FIG. 2, this resulting in a left and a right (core) half. The two core halves can be mutually spaced apart by a magnetically non-conducting element (for example a seal). The casting compound volume 28 in this instance is preferably part of the core half (halves), this resulting in a semicircular element having an encircling groove on the separation face for the electric coil 26. Furthermore preferably, the receptacle 36 is also divided into two halves. One receptacle half, conjointly with a core half, can form one part (be integrally embodied), or one core half can be integrally embodied with a complete receptacle unit 36.

The haptic operating device 100 having the magnetorheological braking device 1 here is unilaterally mounted. The second brake component 3 here is received only at the first end of the closed chamber 110, on an end portion 121 of the first brake component 2, that is to say that the second brake component 3 is mounted only by the mounting 30 at the first bearing point 112. In the event of a variation of the volume within the closed chamber, the second brake component 3 can easily move back and forth. It is again assumed here that the first brake component 2 is stationary. In this case, part of the diameter 116 of the first brake component 2 moves in or out at the first bearing point 112. The volume 114 of the closed chamber 110 changes. Advantageously, the system within the freedom of movement provided is practically always at the ambient pressure. Any additional stressing of the seal 38 is prevented.

Figure 2B:
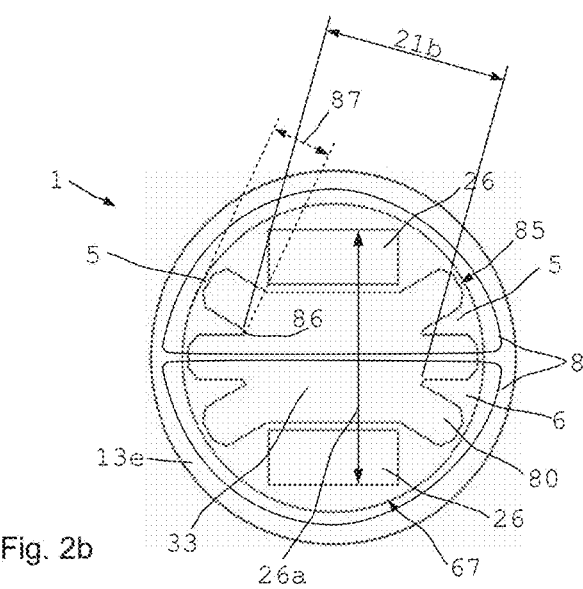
Figure 2C:
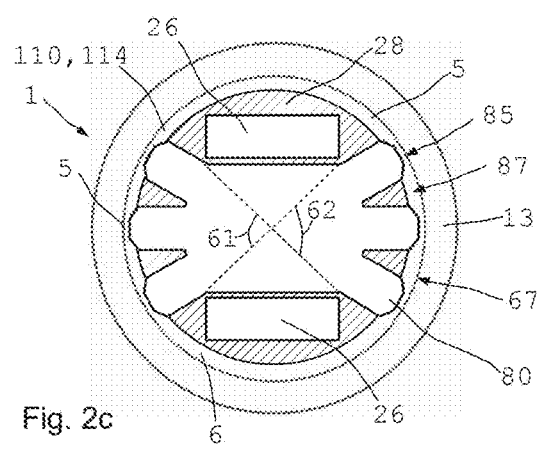

FIGS. 2b and 2c show various schematic cross sections of the magnetorheological braking device 1, said cross sections being able to be used in the device components 200 as per FIG. 2a, and also in other exemplary embodiments.

The inner brake component 2 is configured to be stationary, and is surrounded by the continuously rotatable brake component 3. The second brake component 3 has a casing part 13 which is rotatable about the first brake component and is configured so as to be hollow and cylindrical on the inside. The encircling gap 5 between the first brake component 2 and the second brake component 3 can be seen. The gap 5 here is at least partially, and in particular completely, filled with a magnetorheological medium 6.

The first brake component 2 has the core 21, which extends in the axial direction 20 and is made of a magnetically conductive material, and an electric coil 26 which in the axial direction 20 is wound about the core 21 and defines a coil plane 26c. The magnetic field 8 of the electric coil 26, transversely to the axial direction 20, extends through the first brake component 2, or the core 21.

It can be clearly seen that a maximum external diameter 26a of the electric coil 26 in a radial direction 26d within the coil plane 26c is larger than a minimum external diameter 21b of the core 21 in the radial direction 25 transverse, and for example perpendicular, to the coil plane 26c.

The magnetic field concentrators 80 protrude radially outward from the main body of the core 21. The profile of the magnetic field 8 in an exemplary manner is plotted in FIG. 2b.

The electric coil is disposed outside the angular segments 61 and 62 (cf. FIG. 2c). No magnetic field concentrators 80 are situated outside the angular segments 61 and 62.

The cores 21 have outwardly projecting arms 83 as magnetic field concentrators 80, which from the main body 33 project radially outward. The chamber 110 between the core 21 and the casing part 13 in FIGS. 2b and 2c is completely filled with MRF.

The maximum external diameter 26a of the coil 26 is larger than the minimum core diameter 21b. The radial extent of the gap 5 varies across the circumference. There is only a minor radial gap height 85 at the outer ends of the magnetic field concentrators 80, while a radial gap dimension 87 between the brake component 2 and the brake component 3 at other locations is significantly larger.

However, the radial gap height 85 between an outer end of an arm 83 and an internal surface 67 of the casing part 13 is significantly smaller than a radial gap dimension 87 between the external surface 86 (i.e. the core 21 per se or else a surface of a casting compound 28 on the core) of the first brake component 2 beside the arm 83 and the internal surface 67 of the casing part 13.

FIG. 2c shows a variant of FIG. 2b, in which the chamber 100, in order to decrease the MRF volume, by way of a cylindrical portion is filled with casting compound 28. As a result, the required volume of MRF drops. The radial gap dimension 87 is considerably reduced, but remains substantially larger (at least by a factor of 2 or 3 or 5 or 10) than the radial gap height 85. It is ensured as a result that the described wedge effect arises. The MRF particles interlink in the acute regions and form a type of wedge which leads to a significant braking moment. The magnetic field concentrators 80 in FIGS. 2b and 2c form a type of radial arms 83.

Figure 3A:
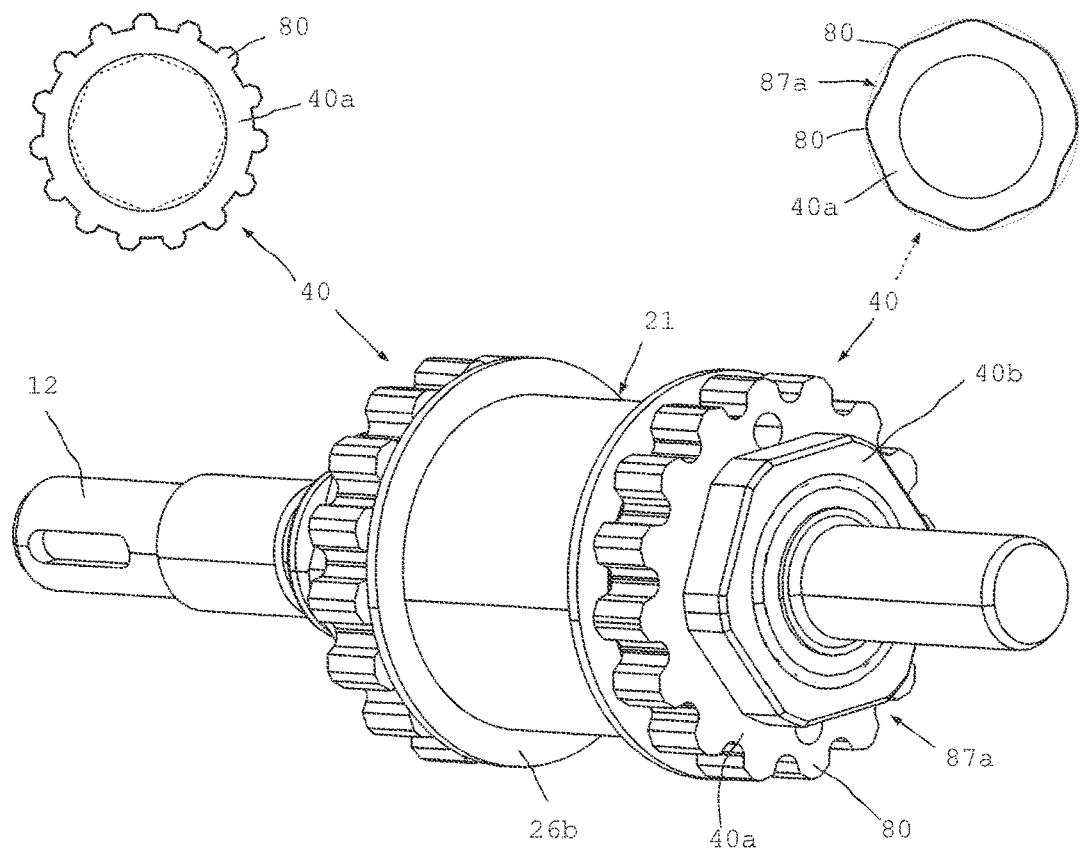
FIGS. 3a-3b show a magnetorheological braking device having a wedge damper having two star contours in each case on one side of the electric coil.
Figure 3B:
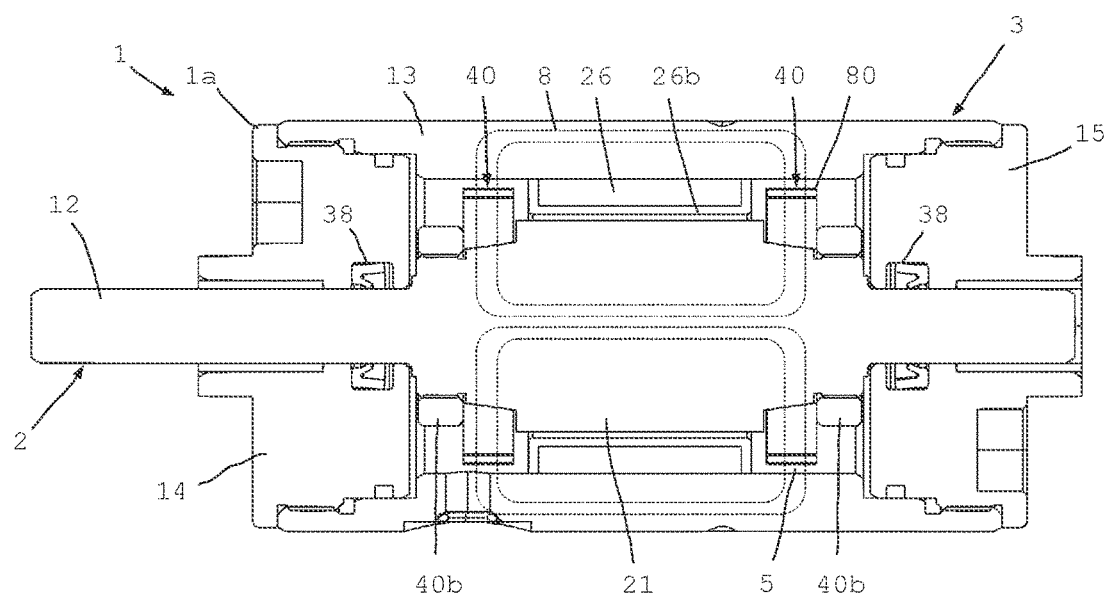

FIGS. 3a and 3b show another magnetorheological braking device 1 for a haptic operating device 100. The magnetorheological braking device 1 comprises a brake housing 1a which here (FIG. 3b) is composed substantially of the two end pieces or covers 14, 15, respectively, and the casing part 13.

The first brake component 2 comprises the axle 12 which on at least one side in a sealed manner is led out of the brake housing 1a. The second brake component 3 comprises the brake housing 1a. The operating button 101 is received or configured on the outside of the brake housing 1a.

The axle 12 can also have a through opening and a longitudinal bore, for example.

The first brake component 2 is typically received in a rotationally fixed manner on a console 50, or on other parts or components, by way of a mount 4 which is not visible here. In this instance, at least the casing part 13 forms a rotatable part of an operating button 101 or the like. The torque required for rotating the casing part 13 is adjustable. However, it is also possible for the brake housing 1a to be assembled in a rotationally fixed manner and for the axle 12 to be rotatable.

The magnetorheological braking device 1 in FIG. 3a is illustrated without an external brake housing 1a and without a casing part 13. Comprised here are two star contours 40 which in the axial direction 20 along the axle 12 are received so as to be mutually spaced apart on the core 21. Each star contour 40 is configured as a separate part and here, by way of a separate screw nut 40b, is fixedly clamped to the core 21. The star contour on the inside can be of a cylindrical or conical design.

The core 21 and the star contours 40 can optionally also have mutually adapted non-round external or internal contours, respectively, so as to guarantee that the star contour 40 is received in a rotationally fixed manner on the core 21. A view of a star contour 40 which on the inside has a through opening is shown at the top left in FIG. 3a. The internal contour can be configured so as to be cylindrical (solid lines) or else non-round (polygon, oval, etc.) (dashed lines).

The magnetic field concentrators 80 are configured radially outside on the star contour 40. A depression 87a is in each case configured between the individual magnetic field concentrators 80. Here, all magnetic field concentrators 80 of a star contour 40 are integrally configured on the star contour 40. Rotatable rollers or other rotating elements are as magnetic field concentrators 80 and also otherwise not present.

The two star contours 40 of the magnetorheological braking device 1 as per FIG. 3a can be identically configured. However, it is also possible that dissimilar star contours 40 are disposed on the right and the left end. In particular, the magnetic field concentrators (which in all design embodiments may also be referred to as contour elements) on the star contours 40 can also be dissimilarly shaped on the right and the left (cf. the star contours depicted individually in each case in the upper part of FIG. 3a). It is also possible for two (or three) dissimilar star contours to be in each case received on one or each end. The contour elements here can be of dissimilar geometric designs and differ from one another in terms of the dimensions.

It can be seen in the cross section as per FIG. 3b that the axle 12 (also referred to as a shaft) by way of seals 38 is sealed in relation to the brake housing 1a. The coil mount 26b on which the electric coil 26 is wound is received between the two star contours 40. The electric coil 26 can be immediately and directly adjacent to the casing part 13 and in this instance is held so as to be magnetically isolated from the core 21. Or, the electric coil 26 can be immediately and directly adjacent to the core 21 and in this instance is held so as to be magnetically isolated from the casing part 13.

A magnetic field line 8 is plotted by way of example. The magnetic field runs between the star contours 40 in a substantially axial manner through the casing part 13, and in the region of the two star contours 40 passes through the gap 5 there in an approximately radial manner, and is concentrated by the magnetic field concentrators 80 so that a wedge effect results in the region of the magnetic field concentrators 80. The magnetic field within the core 21 is closed in the axial direction 20.

In principle, the magnetorheological braking device 1 has a wedge bearing having two star contours 40. In the center there is a magnetically conducting axle or shaft 12 about which an electric coil 26 is wound radially. The electric coil 26 generates a magnetic field 8 which is amplified by the shaft 12 as the core 21. The magnetic field lines 8 lead through the star contour 40 on the one side, onward by way of the magnetically conducting external wall in the casing part 13 to the second star contour 40 on the other side by way of which the field lines close to the shaft 12 again. The magnetic field 8 is very efficiently utilized in this way. MRF as a damping medium is situated in the gap 5 between the star contour 40 and the external wall (casing part 13).

Various star contours can be attached in this construction. To this end, the shaft 12 has a conical receptacle here onto which the annular flanges 40a having the respective star contours 40 configured thereon (e.g. machined into the latter) are pushed. A threaded nut 40b behind the annular flange 40a then presses the annular flange 40a onto the shaft 12 when said threaded nut 40b is tightened.

Figure 4:
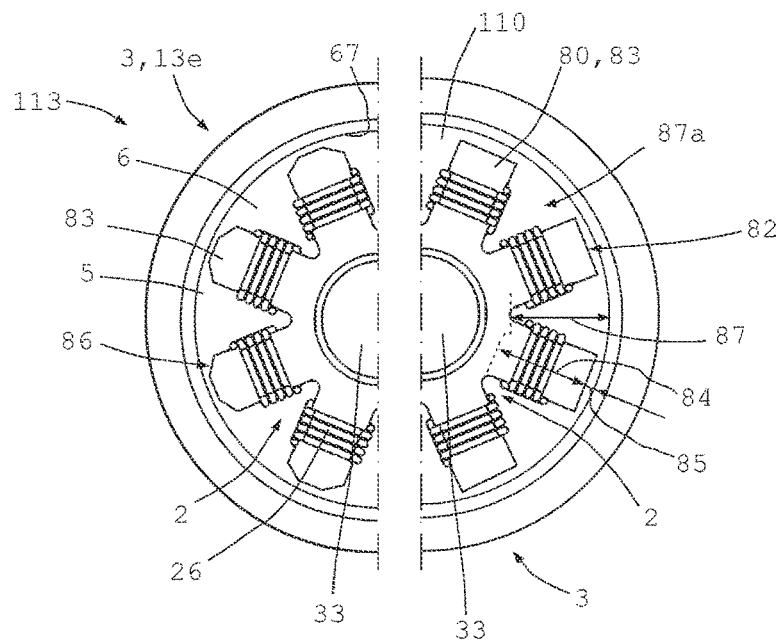
FIG. 4 shows another cross section of a magnetorheological braking device.

FIG. 4 shows two schematic cross sections of other embodiments having a (cylindrical) main body 33. The star contour having the magnetic field concentrators 80 are configured by individual, outwardly projecting radial arms 83, wherein the radial arms 83 are configured integrally with the core 21 and are composed of a material which is positively magnetically conducting.

Each individual arm 83 here is wrapped by an electric coil 26 of the magnetic field generator 113. The electric coils 26 are preferably conjointly actuated, but can also be actuated differently and/or individually. The distal ends 82, here the radially outer ends 82, of the arms 83 can be configured so as to be wedge-shaped, radiused or else angular. In the case of radially inwardly projecting arms 83 as magnetic field concentrators 81, the radially inner end as the distal end 82 can accordingly be configured so as to be wedge-shaped, radiused or else angular. The maximum generatable moment and the response time are influenced by the shape.

The arm height 84 is significantly larger (by a factor of 10, 50, 100 and far more) than the radial gap height 85 between an external end of an arm 83 and an internal surface 67 of the casing part 13.

However, the radial gap height 85 between an external end of an arm 83 and an internal surface 67 of the casing part 13 is significantly smaller than a radial gap dimension 87 between the external surface 86 (core 21 or else a surface of a casting compound 28) of the first brake component 2 beside the arm 83 and the internal surface 67 of the casing part 13. The ratio of the radial gap dimension 87 to the radial gap height 85 is preferably more than 2, 5 or 10 or more. A certain enlargement is important with a view to the formation of the wedge.

Figure 5:
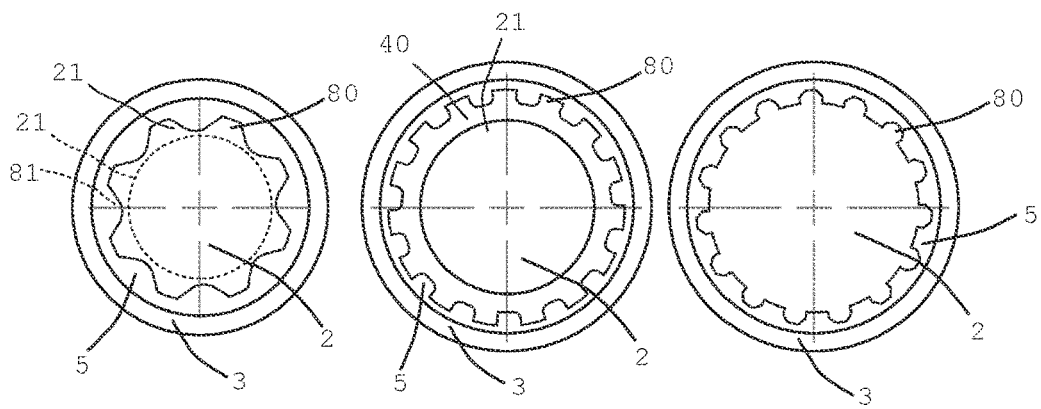
FIG. 5 shows further schematic cross sections of a magnetorheological braking device in a sectional view.

Three different external contours of a core 21 on a casing part 13 which is configured with a cylindrical cavity are depicted in FIG. 5. The magnetic field concentrators 80 which project radially outwardly on the star contours 40 may have different shapes. The outwardly protruding magnetic field concentrators 80 form a gap 5 which is variable across the circumference, so that the magnetic field 8 in the region of the magnetic field concentrators 80 is bundled when said magnetic field 8 transitions from the core 21 into the casing part 13. The star contours 40 are formed by annular flanges having magnetic field concentrators 80 outwardly projecting from the latter. The annular flanges are in each case configured so as to be hollow and, on the inside, can be shaped so as to be non-round, in order to guarantee a rotationally fixed connection to the core, the latter in this instance also being designed so as to be non-round there.

A variant in which the magnetic field concentrators 81 project inward and the core 21 is provided on the inside is illustrated in a purely schematic manner by dashed lines in the left image of FIG. 5. In this instance, a reversed image is created. Different properties can be achieved by the shaping of the ends of the magnetic field concentrators 80 and/or 81. In this way, the focus can be set on a higher braking moment or a faster response time.

Figure 6:
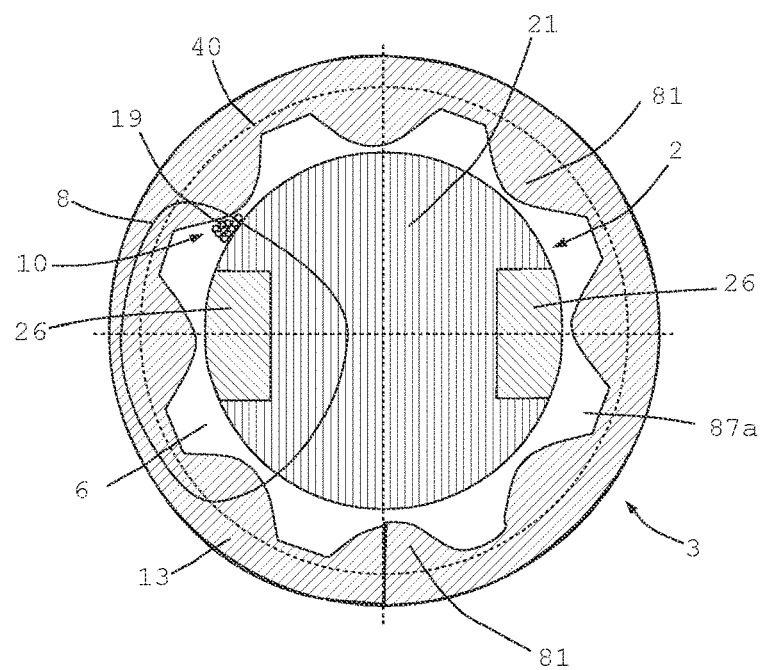
FIG. 6 shows another schematic cross section of a magnetorheological braking device.

FIG. 6 shows a schematic variant having a central cylindrical core 21 and a casing part 13, magnetic field concentrators 81 projecting periodically in a radially inward manner from the latter. A highly schematic magnetic field line 8 which radially passes through the gap 5 between the core 21 and a magnetic field concentrator 81 is plotted in the drawing. A cluster of the particles 19 of the MRF interlinks at the constriction in the gap 6 filled with the medium 6, and in an acute region 10 forms a wedge (cluster) which generates a high braking moment.

Besides the variant illustrated in which the electric coil in the axial direction is wound about the core, a variant in which the electric coil 26 is wound radially about the rotation axis (2) is also possible.

FIGS. 7a to 7e show a further embodiment of a device component 200 which possesses a magnetorheological braking device 1 and comprises brake components 2 and 3. A "lying or axial coil" is again used, in which the electric coil 26 in the axial direction 20 is wound about the core 21, and said electric coil 26 again has a maximum radial coil diameter 26a which is larger than a minimum core diameter 21b of the core 21. Here too, magnetic field concentrators 80 which project radially outward and concentrate the magnetic field in the thin radial gap and ensure the wedge effect are provided. This is not conventional shear damping, because the gap height of the gap 5 massively varies across the circumference. Horizontal lines which show the radial starting point for the magnetic field concentrators 80 are plotted in the drawing here. The gap height outside the magnetic field concentrators 80 is very much larger (here by a factor of >50 or 100 or 1000).

The device component 200 here is embodied as a haptic operating device 100 and in detail embodied as an operating button 101. The second brake component 3 at the first end 111 of the closed chamber 110 is received on the bearing point 112. Moreover, the second brake component 3 at the second bearing point 118 at the second end 115 of the closed chamber 110 is received on the first brake component 2. As a result of the mounting, forces in the (global) radial direction 122 are absorbed, while the brake components 2, 3 are furthermore axially displaceable relative to one another.

The mounting here is implemented by means of a stub axle 119 having the diameter 117 at the second bearing point 118. The annular seal 46 prevents the magnetorheological medium 6 flowing into the region behind the stub axle 119.

The diameter 117 at the second bearing point 118 here is embodied so as to be considerably smaller than the diameter 116 at the first bearing point 112. In this way, a volumetric variation in the event of an axial displacement is enabled here too. Temperature-related volumetric variations and volumetric variations caused by leakages can be compensated for. To this end, a relative axial displacement of the first brake component 2 in relation to the second brake component 3 takes place. In order for the throttle effect by way of the gap 5 in the event of an axial displacement to be reduced, a compensation duct 120 which connects the two regions close to the bearing points 112, 118 can be provided.

Moreover, a sensor device 70 for detecting an angular position of the haptic operating device 100 is present here too. The magnetic field sensor 72 is integrated in the stationary receptacle 4, or the first brake component 2. The cable 45 of the magnetic field sensor 72, i.e. the sensor line 73, at the receptacle 36 is routed outward by way of the cable conduit 35.

As is illustrated in FIGS. 7b and 7c, the first axle part, or the mount 4 of the brake component 2, can preferably be embodied in two parts. As a result, the assembling of the electrical lines, and in particular of the sensor line 73, within the first brake component 2 is simplified above all. The cables can be installed by way of the open cable conduit 35.

The sensor device 70 is illustrated once more in detail in FIG. 7d. The first brake component 2 and the second brake component 3, here embodied as the rotating part, are only indicated (by dashed lines). The sensor device 70 by way of the decoupling device 78 is supported in a magnetically decoupled manner on the rotatable second brake component 3. The shielding device 75 here is composed of three shielding members 76 which mitigate straying of the magnetic field 8 of the electric coil 26. Moreover present is also a separation unit 77 for the magnetic separation. The magnetic ring unit 71 is utilized for measuring the orientation, or the rotation angle, of the magnetorheological braking device 1. The magnetic field sensor 72 is disposed within the first brake component 2. Moreover, small relative axial displacements can be utilized to detect a depressed operating button 101, for example, cf. FIG. 7e.

The received signal 68 of the sensor device according to the illustration of FIG. 8 changes as a result of an axial displacement. FIG. 8 shows the profile of the amplitude 69 of the signal 68 detected by the magnetic field sensor 72, illustrated as a function of the axial displacement of the brake components 2, 3 (horizontal axis). The amplitude 69 of the detected signal 68 varies as a result of an axial displacement of the magnetic field sensor 72 in relation to the magnetic ring unit 71. An axial displacement of an operating button 101, or depressing the latter, or a lateral displacement of a mouse wheel 106, for example, or of other components can be detected.

The rotation angle can also be detected by the same sensor 72, wherein the direction of the magnetic field 8 is determined in order for the rotation angle to be detected. The intensity determines the axial position. An activation of the momentary contact switch 74 can be concluded from a variation of the signal 68. This is advantageous because a single (multi-dimensional) Hall sensor can be used for determining the angular position and for determining an axial position.

Figure 8A:
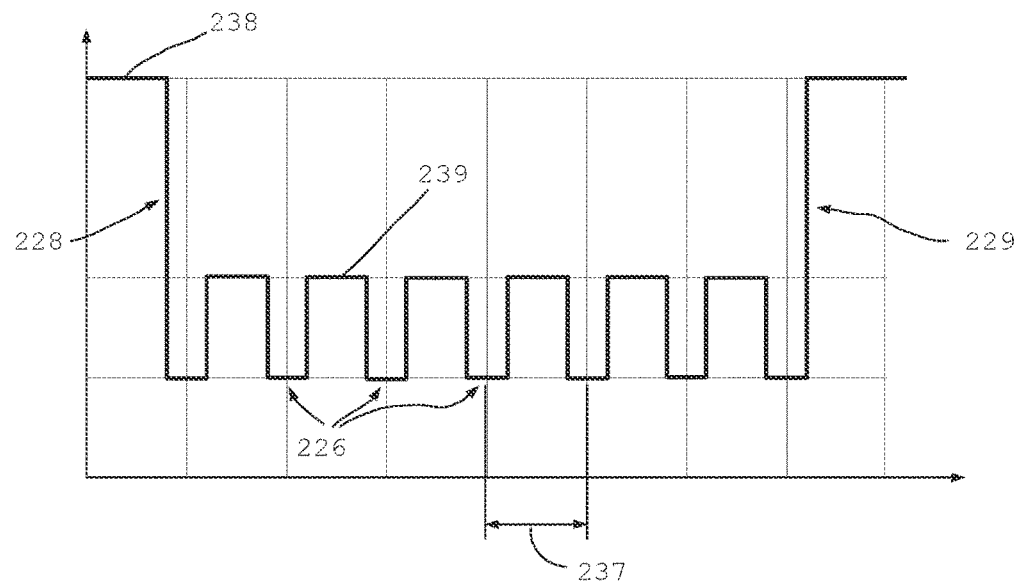
FIGS. 8a-8c show potential torque profiles over the rotation angle of a magnetorheological braking device of a device component according to the invention.
Figure 8B:
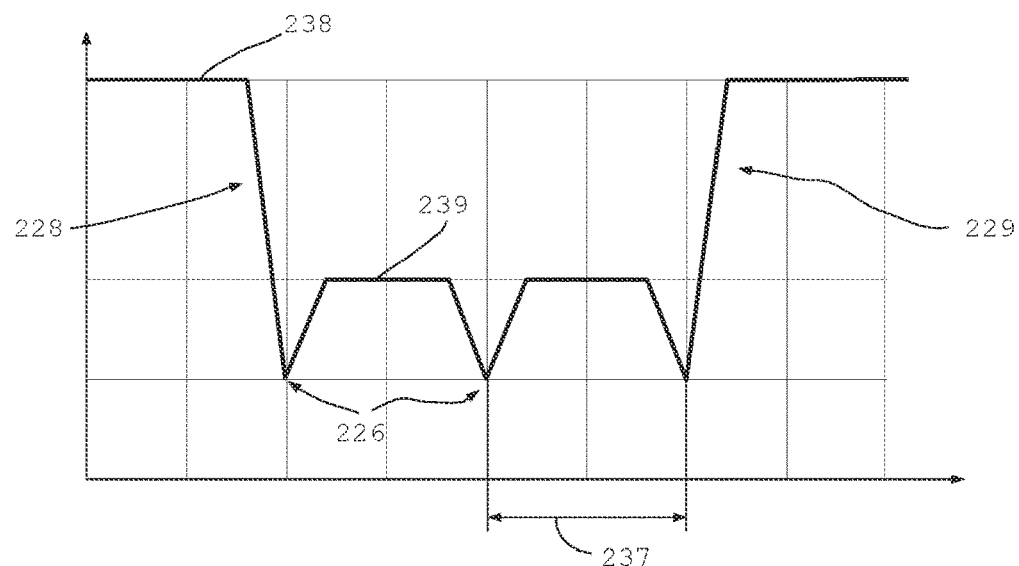
Figure 8C:
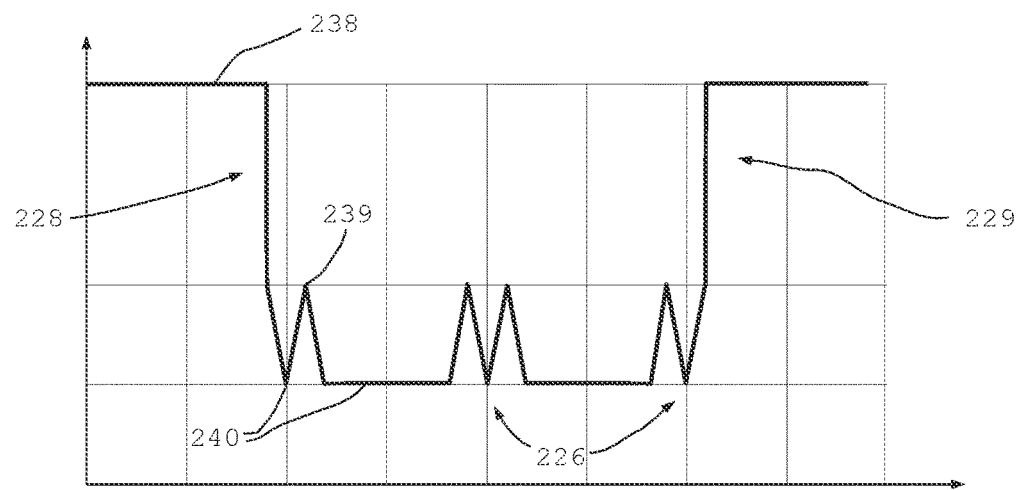

Potential variants of embodiments for controlling a dynamically generated magnetic field, or a dynamically generated braking moment, as a function of the rotation angle are illustrated in FIGS. 8a, 8b and 8c.

FIG. 8a here shows a variant in which a rotary button is used as a haptic operating aid. Illustrated is the rotational resistance over the rotation angle. A left terminal detent 228 and a right terminal detent 229 can be generated by the control device 27. As the rotary button 23 is rotated further, an intense magnetic field, or detent moment 238, is generated thereon, as a result of which the rotary button 23 puts up a high resistance in relation to a rotating movement. The user receives the haptic feedback of a terminal detent.

Rippling of the rotating movement can take place, or be generated, in the process (ripples/ticks). This can be used, for example, for navigating a graphic menu and selecting menu items. A first ripple point 226 which during operation corresponds to a first menu item, for example, is provided here directly beside the left terminal detent 228. If the next menu item is to be selected, the rotary button 100 has to be rotated in the clockwise manner. To this end, the dynamically generated, more intense magnetic field, or the ripple moment 239, or the frictional moment of the latter, has to be overcome before the next ripple point 226 is reached. In FIG. 8a, a respective constant magnetic field for a specific angular range is in each case generated at the ripple points 226 and the intervening regions, said magnetic field at the ripple points being significantly less intense than in the intervening regions, and being again considerably less intense than at the detents 228, 229. A set torque, or else the base moment 240 resulting from the construction, may act on the ripple points 226.

An angular spacing 237 between individual ripple points is dynamically variable and is adapted to the number of available ripple points, or menu items.

FIG. 8b shows a variant in which the magnetic field does not abruptly increase toward the terminal detents 228, 229, but assumes a steep profile. Furthermore, ramp-type gradients of the magnetic field are in each case provided in both directions of rotation at the ripple points 226, as a result of which the rotational resistance increases in the corresponding directions of rotation. Here, only three ripple points 226 are made available by the same operating device 100, the angular spacing 237 of said ripple points 226 being larger than in the example according to FIG. 8*a*.

FIG. 8*c* shows a variant in which a lower frictional resistance is present between individual ripple points 226 and a more intense magnetic field 239 is in each case generated only directly adjacent to the ripple points 226, so as to enable latching at the individual ripple points 226 and simultaneously make available only a minor rotational resistance between individual ripple points.

In principle, a mix of the operating modes and the magnetic field profiles of FIGS. 8*a*, 8*b* and 8*c* is also possible. For example, in the case of dissimilar sub-menus, a correspondingly different adjustment of the magnetic field profile can take place (torque over angle).

In all cases it is also possible, for example in the event of a ripple, that switching no longer takes place between a lower and a higher amperage of identical polarity (thus, for example, +0.2 to +0.8 A=ripple) as to date, but takes place in an alternating manner with variable polarity, i.e. from +0.2 to +0.8 A and then for the next ripple by way of −0.2 A to −0.8 A, and then for the next moment peak from +0.2 A to +0.8 A, etc.

In all cases it is also possible for the operating modes of FIGS. 8*a*, 8*b* and 8*c*, or a mix of the operating modes, to be selected by voice commands. The user by way of voice input (using local or remote voice recognition, for example by way of Alexa, Amazon Echo, Siri, Google voice input, etc.) selects a function (volume, station, etc.). The magnetorheological braking device then makes available a corresponding operating mode (volume=ripple with increasing braking moment for increasing volume; radio station selection=ripple with different increments and a minor braking moment therebetween until the station is found).

The preferably low-alloy steel can contain a residual magnetic field. The steel is preferably demagnetized regularly or when required (inter alia by a special alternating field).

The material FeSi3P (silicon steel), or a material of a related generic type, is preferably used for the components passed through by the magnetic field.

In all cases, voice or noise control can be performed. The braking device can be adaptively controlled using the voice control.

When the rotating unit is not being rotated, i.e. when the angle is constant, the current is preferably continuously reduced over time. The current can also be varied as a function of the speed (angular speed of the rotating unit).

| List of reference signs: | |
| --- | --- |
| 1 | Magnetorheological braking device |
| 1a | Brake housing |
| 2 | Brake component |
| 3 | Brake component |
| 4 | Mount |
| 5 | Gap, duct |
| 6 | Medium |
| 8 | Field |
| 10 | Acute region |
| 12 | Axis |
| 13 | Casing part |
| 13a | Diameter |
| 13b | Diameter |
| 13c | Height |
| 13d | Wall thickness |
| 13e | Sleeve part |
| 14 | End piece |
| 15 | End piece, cover |
| 19 | Magnetic particles |
| 20 | Axial direction |
| 21 | Core |
| 21b | Minimum diameter |
| 23 | Rotary button |
| 24 | External ring |
| 25 | Radial direction |
| 26 | Coil |
| 26a | Maximum diameter |
| 26b | Coil mount |
| 26c | Coil plane |
| 26d | Radial direction to 26c |
| 27 | Control device |
| 28 | Casting compound |
| 30 | Bearing |
| 32 | Transverse groove |
| 33 | (Cylindrical) main body |
| 35 | Cable conduit |
| 36 | Receptacle |
| 36a | External diameter |
| 37 | Cylindrical running face |
| 37a | External diameter |
| 38 | Seal |
| 40 | Star contour |
| 40a | Annular flange |
| 40b | Nut |
| 43 | User interface |
| 45 | Cable |
| 49 | Covering |
| 50 | Console |
| 61 | Angular segment |
| 62 | Angular segment |
| 67 | Internal surface of 13 |
| 68 | Signal |
| 69 | Amplitude |
| 70 | Sensor device |
| 71 | Magnetic ring unit |
| 72 | Magnetic field sensor |
| 73 | Sensor line |
| 74 | Momentary contact switch |
| 75 | Shielding device |
| 76 | Shielding member |
| 77 | Separation unit |
| 78 | Decoupling device |
| 80 | Magnetic field concentrator |
| 81 | Magnetic field concentrator |
| 82 | Distal end |
| 83 | Arm |
| 84 | Radial length of the arm |
| 85 | Gap height |
| 86 | External surface |
| 87 | Gap dimension |
| 87a | Depression |
| 100 | Haptic operating device |
| 101 | Operating button |
| 102 | Thumb wheel |
| 103 | Computer mouse |
| 104 | Joystick |
| 105 | Gamepad |
| 106 | Mouse wheel |
| 110 | Closed chamber |
| 111 | First end of 110 |
| 112 | First bearing point |
| 113 | Magnetic field generator |
| 114 | Volume of 110 |
| 115 | Second end of the closed chamber |
| 116 | Diameter of first bearing point |
| 117 | Diameter of second bearing point |
| 118 | Second bearing point |
| 119 | Stub axle |
| 120 | Compensation duct |
| 121 | End portion of 2 |

-continued

| List of reference signs: | |
|---|---|
| 122 | Radial direction (global) |
| 200 | Device component |
| 226 | Ripple point |
| 228 | Terminal detent |
| 229 | Terminal detent |
| 237 | Angular spacing |
| 238 | Detent moment |
| 239 | Ripple moment |
| 240 | Base moment |

The invention claimed is:

1. A magnetorheological braking device, comprising:
a brake housing and a stationary mount;
at least two brake components including a first brake component and a second brake component that are continuously rotatable relative to one another and having one of said two brake components non-rotatably affixed to said mount;
said first brake component extending in an axial direction and having a core of a magnetically conductive material that extends in the axial direction, and said second brake component having a hollow casing part which extends around the first brake component;
wherein an encircling gap is formed between said first and second brake components which is at least partially filled with a magnetorheological medium;
at least one electric coil received in said brake housing;
a star contour with magnetic field concentrators disposed between said casing part and said core, said magnetic field concentrators protruding radially into said gap and rendering said an encircling gap with a variable gap height in a region of said star contour.

2. The magnetorheological braking device according to claim 1, wherein said star contour is one of at least two star contours received in said brake housing.

3. The magnetorheological braking device according to claim 2, wherein two star contours are received so as to be axially spaced apart from one another.

4. The magnetorheological braking device according to claim 2, wherein at least two star contours have a dissimilar external contour.

5. The magnetorheological braking device according to claim 2, wherein at least one star contour has radially outwardly projecting magnetic field concentrators and is fastened magnetically conductively to said core.

6. The magnetorheological braking device according to claim 2, wherein at least one star contour has radially inwardly projecting magnetic field concentrators and is fastened magnetically conductively to said casing part.

7. The magnetorheological braking device according to claim 1, wherein said magnetic field concentrators extend across an external circumference of said core by way of at least one angular segment.

8. The magnetorheological braking device according to claim 7, wherein each angular segment is smaller than 150°.

9. The magnetorheological braking device according to claim 7, wherein no magnetic field concentrator is disposed outside the angular segment.

10. The magnetorheological braking device according to claim 7, wherein said electric coil which in the axial direction is wound about said core is received on said core outside the angular segment.

11. The magnetorheological braking device according to claim 1, wherein said core comprises a plurality of arms and/or said casing part comprises a plurality of arms forming said magnetic field concentrators, said arms projecting radially.

12. The magnetorheological braking device according to claim 11, wherein a radial length of an arm is smaller than a length of the arm in the axial direction.

13. A device component, comprising a magnetorheological braking device according to claim 1.

14. The device component according to claim 13, comprising at least one user interface, an operating panel, a display, a touch-sensitive display with or without haptic feedback, and/or at least one sensor.

15. The magnetorheological braking device according to claim 1, wherein at least one of said magnetic field concentrators has a cross-sectional area that tapers toward a distal end.

16. The magnetorheological braking device according to claim 1, wherein at least one of said magnetic field concentrators is configured so as to be radiused on a distal end.

17. The magnetorheological braking device according to claim 1, wherein at least one electric coil is wound about the said core in the axial direction and is configured to generate substantially a magnetic field in the radial direction.

18. The magnetorheological braking device according to claim 1, wherein at least one electric coil is wound about an axis and is configured to generate substantially a magnetic field in the axial direction.

19. The magnetorheological braking device according to claim 1, wherein an electric coil is received radially between said core and said casing part.

20. The magnetorheological braking device according to claim 1, wherein said electric coil is fastened to an inside of said casing part or is wound about said core.

21. The magnetorheological braking device according to claim 1, wherein a magnetic field of said electric coil runs through said core and said star contour with said magnetic field concentrators, and through said gap and a wall of said casing part.

22. The magnetorheological braking device according to claim 1, wherein said casing part, across at least one axial portion of said casing part, has a cylindrical internal surface.

23. The magnetorheological braking device according to claim 1, wherein said electric coil extends axially about at least one arm of said core, and wherein a radial gap height between an outer end of an arm and an internal surface of said casing part is smaller than a radial gap dimension between an external surface of said first brake component beside the arm and an internal surface of said casing part.

24. The magnetorheological braking device according to claim 1, wherein said second brake component is received so as to be axially displaceable on said first brake component to enable volumetric compensation in an event of temperature variations or leakage.

25. The magnetorheological braking device according to claim 1, wherein said second brake component by way of two bearing points of dissimilar external diameters is rotatably received on said first brake component so as to, by way of an axial displacement, cause a volumetric variation in a chamber configured between said first brake component and said second brake component.

26. The magnetorheological braking device according to claim 1, wherein a closed chamber is configured between said brake components, and wherein the second brake component at a first end of said closed chamber is rotatably received on said first brake component, and wherein said closed chamber is substantially filled with the magnetorheological medium.

27. The magnetorheological braking device according to claim 1, wherein said casing part comprises a sleeve part made from a magnetically conducting material and forming an external ring for the magnetic field.

28. The magnetorheological braking device according to claim 1, configured to generate magnetic field strengths of more than 350 kA/m in said gap.

* * * * *